Feb. 17, 1970  H. E. KLUKSDAHL  3,496,096
REGENERATING A PLATINIUM-RHENIUM REFORMING CATALYST
Filed March 12, 1969

INVENTOR
HARRIS E. KLUKSDAHL
BY
ATTORNEYS

United States Patent Office 3,496,096
Patented Feb. 17, 1970

3,496,096
REGENERATING A PLATINIUM-RHENIUM REFORMING CATALYST
Harris E. Kluksdahl, San Rafael, Calif., assignor to Chevron Research Company, San Francisco, Calif., a corporation of Delaware
Continuation-in-part of application Ser. No. 729,079, May 14, 1968. This application Mar. 12, 1969, Ser. No. 806,378
Int. Cl. C10g 35/06; B01j 11/02
U.S. Cl. 208—140                    7 Claims

ABSTRACT OF THE DISCLOSURE

A catalyst comprising a platinum group component and a rhenium component in association with a porous inorganic oxide carrier which has become deactivated from exposure to a hydrocarbon feed under reforming conditions and has carbonaceous matter accumulated thereon is regenerated by the steps of (1) contacting the catalyst with a regeneration gas containing oxygen at a partial pressure of from 0.1 to 2.5 p.s.i.a. at a temperature below 800° F. to remove substantially all of the carbonaceous matter, (2) contacting the catalyst with a regeneration gas containing oxygen at a partial pressure of from 1.0 to 2.5 p.s.i.a. at a temperature of from 800 to 900° F., and then (3) contacting the catalyst with a regeneration gas containing oxygen at a partial pressure greater than 2.5 p.s.i.a. at a temperature above about 900° F., and (4) finally contacting the catalyst with a hydrogen containing gas at a temperature above 600° F. Halide is introduced into the regeneration gas at a temperature greater than 800° F. to provide the finished catalyst with a halide content of at least 0.6 weight percent.

CROSS-REFERENCE

This application is a continuation-in-part of application Ser. No. 729,079, filed May 14, 1968, which in turn is a continuation-in-part of application Ser. No. 639,719, filed May 19, 1967, now U.S. Patent No. 3,415,737, which in turn is a continuation-in-part of application Ser. No. 560,166, filed June 24, 1966, now abandoned.

BACKGROUND OF THE INVENTION

Field

The present invention relates to the regeneration of a catalyst comprising a platinum group component and a rhenium component in association with a porous inorganic oxide carrier. More particularly, the present invention relates to regeneration of a platinum-rhenium catalyst at increasingly more severe conditions of temperature and oxygen partial pressure, followed by heating the catalyst in a hydrogen atmosphere.

Prior art

It has been found that a catalyst composition comprising platinum and rhenium supported on a porous inorganic oxide carrier is especially suitable for reforming. The catalyst has increased selectivity and stability compared with a catalyst comprising platinum without rhenium. Due primarily to the exceptional yield stability of the platinum-rhenium catalyst, prolonged periods of reforming can be achieved.

During the reforming process the catalyst deactivates for various reasons among which are the changes in the physical state of the platinum and/or rhenium, the accumulation of carbonaceous matter on the catalyst and contamination with other heavy metals which are present in limited amounts in the feed. As the activity of the catalyst decreases, the temperature necessary to maintain constant conversion of the feed to high octane product must be increased. After the catalyst decreases in activity to a certain level, that is, after the temperature necessary to maintain constant conversion in the process reaches a certain level, it is usually necessary either to replace the catalyst or to regenerate it. Obviously the most desirable procedure is to regenerate the catalyst by removing carbonaceous material therefrom and restoring the activity of the catalyst substantially to that of fresh catalyst.

SUMMARY OF THE INVENTION

A novel regeneration procedure for a catalyst comprising a platinum group component and a rhenium component in association with a porous inorganic oxide carrier has been found. The regeneration procedure is effective in removing carbonaceous deposits from the catalyst and restoring the activity and yield stability characteristics of the catalyst to that of fresh catalyst.

The process of the present invention involves regenerating a catalyst comprising a platinum group component and a rhenium component in association with a porous inorganic oxide carrier by the sequence of steps of: (1) contacting the catalyst with a gas containing oxygen at a partial pressure of from 0.1 to 2.5 p.s.i.a. at a temperature below about 800° F. for a period of time to remove substantially all of the carbon which has accumulated on the catalyst during the reforming process, (2) contacting the catalyst with gas containing oxygen at a partial pressure of from about 1.0 to 2.5 p.s.i.a. at a temperature of from 800 to 900° F., and (3) contacting the catalyst with a gas containing oxygen at a partial pressure greater than 2.5 and at a temperature greater than 900° F. Halide is injected into the oxidizing gas at a temperature above 800° F. in an amount sufficient to provide the finished catalyst with a halide content of greater than 0.6 weight percent. Preferably, the regenerated catalyst is heated with a hydrogen containing gas at a temperature above 600° F. prior to reforming.

DESCRIPTION OF THE DRAWING

The present invention will be better understood and more fully described hereinafter with reference to the drawing in the figures. The drawings in FIGURES 1 and 2 show for comparison purposes the average catalyst temperature and C$_5$+ liquid yield, respectively, as a function of hours onstream for (1) a fresh catalyst comprising platinum and rhenium in association with alumina, and (2) a catalyst comprising platinum and rhenium in association with alumina which catalyst has been deactivated and then regenerated by the process of the present invention. It is apparent from the figures that regeneration of the platinum-rhenium catalyst in accordance with the present invention substantially restores the activity and yield stability of the catalyst to that of fresh catalyst.

DESCRIPTION OF THE INVENTION

Figure 1:
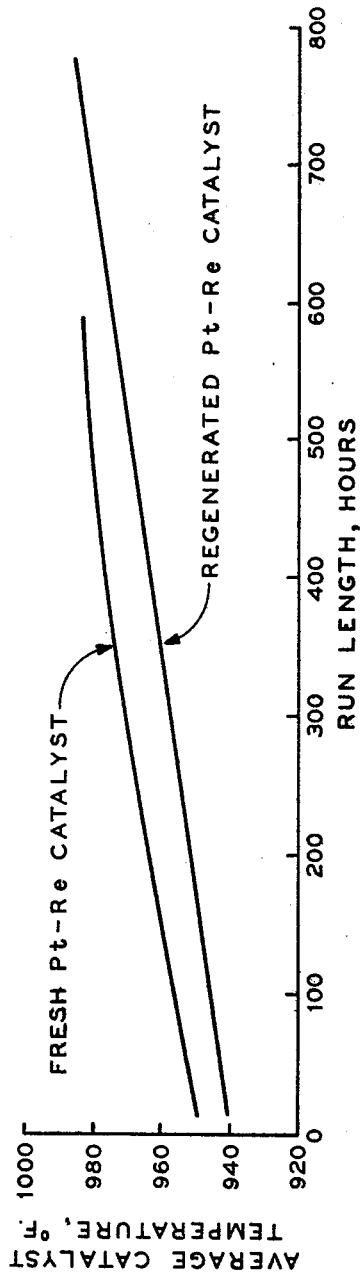

The catalyst which can be regenerated by the process of the present invention comprises a platinum group component and a rhenium component in association with a porous inorganic oxide. Suitable porous inorganic oxide carriers or supports which find use in the present invention include a large number of materials on which the catalytically active amounts of the platinum group component and the rhenium component can be disposed. By "porous inorganic oxide" is meant any inorganic oxide having a surface area greater than 50 m.²/gm. and preferably greater than 150 m.²/gm.; preferably the porous inorganic oxide support has a surface area from 50 to 700 m.²/gm. The support can be a naturally or a synthetically produced inorganic oxide or a combination of inorganic oxides. Typical porous inorganic oxide supports which can be used are the naturally occurring aluminosilicates, particularly when acid treated to increase the activity, synthetically produced cracking supports such as silica-alumina, silica-zirconia, silica-alumina-zirconia, silica-magnesia, silica-alumina-magnesia, and crystalline zeolitic aluminosilicates. Generally, however, for reforming processes it is preferred that the catalyst has low cracking activity, that is, has low acidity. Hence preferred catalysts are inorganic oxides such as alumina and magnesia.

A particularly preferred catalyst carrier is alumina. Any of the forms of alumina suitable as a support for reforming catalysts can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

The catalyst should comprise a platinum group component in an amount from 0.01 to 3 weight percent and preferably from 0.01 to 1 weight percent based on the finished catalyst. A platinum group component embraces all the members of Group VIII of the Periodic Table having an atomic weight greater than 100 as well as compounds and mixtures of any of these. Thus, the platinum group components are the Group VIII noble metals or compounds thereof. Platinum is preferred because of its better performance in reforming. The concentration of the rhenium component in the finished catalyst composite is preferably in the range of from 0.01 to 5 weight percent and more preferably 0.1 to 2 weight percent. Regardless of the form in which the platinum group component and the rhenium component exist on the catalyst, whether as metal or compound, the weight percent of each is calculated as the metal.

The platinum group component and rhenium component can be associated with the porous inorganic oxide by various methods. The platinum group component and rhenium component can be disposed on the porous inorganic oxide in intimate admixture with each other by a suitable technique such as ion-exchange, coprecipitation, impregnation, etc. It is not necessary that the platinum group component and rhenium component be incorporated onto the porous inorganic oxide support by the same technique. One of the components can be associated with the porous inorganic oxide by one method, such as, for example, coprecipitation, and the other component associated with the porous inorganic oxide by another technique, such as, for example, impregnation. Furthermore, the components can be associated with the porous inorganic oxide either sequentially or simultaneously. It is generally preferred that the components be associated with the porous inorganic oxide by impregnation, either sequentially or simultaneously. In general the porous inorganic oxide is impregnated with an aqueous solution of a decomposable compound of platinum, etc., or rhenium, in sufficient concentration to provide the desired quantity of the platinum group component and rhenium component on the finished catalyst. To incorporate the preferred platinum group component, platinum, onto the porous inorganic oxide by impregnation, chloroplatinic acid is preferred. Other platinum group compounds are ammonium chloroplatinates, polyammineplatinum salts, palladium chloride, etc. Rhenium is suitably incorporated onto the support by impregnation with perrhenic acid. Ammonium, or potassium perrhenates, among others can also be used.

The catalyst can be promoted for reforming by the addition of halides, particularly fluoride or chloride. Bromides may also be used. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any sutable stage of catalyst manufacture, e.g., prior to or following incorporation of the platinum group component and rhenium component. Some halide is often incorporated onto the carrier by impregnating with the platinum group component; that is, for example, impregnation with chloroplatinic acid normally results in chloride addition to the carrier. Additional halide may also be incorporated onto the alumina if desired. In general, the halides are combined with the alumina by contacting suitable compounds such as hydrogen fluoride, ammonium fluoride, hydrogen chloride, or ammonium chloride, either in the gaseous form or in a water soluble form with the alumina. Preferably the fluoride or chloride is incorporated onto the carrier from an aqueous solution containing the halide.

Reforming is generally conducted by contacting a light hydrocarbon oil, e.g., a naphtha fraction, boiling within the range of 70 to 550° F. and preferably from 150 to 450° F. with the catalyst comprising a platinum group component and a rhenium component at a temperature in the range of from 600 to 1100° F., preferably 700 to 1050° F., and at a pressure of from atmospheric to superatmospheric, preferably from 25 to 1000 p.s.i.g. and more preferably from 50 to 750 p.s.i.g. The actual reforming conditions will depend in large measure on the feed used, whether highly aromatic, paraffinic or naphthenic and upon the desired octane rating of the product. Furthermore the temperature and pressure can be correlated with the liquid hourly space velocity (LHSV) to favor any particularly desirable reforming reaction as, for example, aromatization, isomerization or dehydrogenation. In general, the liquid hourly space velocity will be from 0.1 to 10 and preferably from 1 to 5. The reforming process is conducted in the presence of hydrogen, either recycle hydrogen or fresh hydrogen, and generally the hydrogen rate will be from 0.5 to 20 moles of hydrogen per mole of feed.

Whereas the regeneration process of the present invention is described particularly in terms of reforming, it is understood that the process of the present invention can be used to regenerate a catalyst comprising a platinum group component and a rhenium component which has been used in other hydrocarbon hydroconversion processes such as, for example, hydrocracking, dealkylation, isomerization, dehydrogenation, etc.

As mentioned previously, during the process of reforming the platinum group component-rhenium component catalyst gradually loses activity and carbonaceous deposits become accumulated thereon. Carbonaceous deposits on the catalyst may reach a level of as high as from 15 to 20 weight percent, or more, based on the catalyst. As the catalyst loses activity the temperature must be increased in order to maintain constant conversion of the feed to high octane gasoline products. After the catalyst temperature reaches an elevated temperature, e.g., 1000° to 1100° F., it becomes necessary to regenerate the catalyst in order to restore the catalyst substantially to its initial activity.

After the catalyst becomes sufficiently deactivated and carbonaceous deposits accumulated thereon, the flow of feed to the catalyst is discontinued and the catalyst preferably purged with an inert gas, e.g., nitrogen, to remove any remaining hydrocarbons. The catalyst is then regenerated either in situ or ex situ depending on the circumstance. The catalyst is first heated to a temperature below about 800° F., e.g., from 500 to 800° F., in contact with a regenerating gas, preferably an inert gas, e.g., nitrogen, containing oxygen at an oxygen partial pressure of from 0.1 to 2.5 p.s.i.a. to burn carbonaceous deposits from the catalyst. The total pressure of the regeneration gas during regeneration is preferably in the range of from 25 to 500 p.s.i.a. Preferably the temperature of the catalyst is from 600 to 800° F. during contact with the regeneration gas containing oxygen at a partial pressure of from 0.1 to 2.5 p.s.i.a. The catalyst can be heated to the proper temperature of from 500 to 800° F. by means of the heated regeneration gas; or the catalyst can be heated to the desired temperature by other means, e.g., an insert gas without oxygen and then contacted with the regeneration gas. Once the carbon starts to burn, there will be an increase in catalyst temperature. Care must be exercised in the low temperature combustion step to prevent temperature runaways from increasing the temperature of the catalyst to above about 800° F. Thus, usually dilute oxygen streams are used as well as careful temperature monitoring. If the catalyst temperature starts to exceed about 800° F., the flow of oxygen to the catalyst should be decreased. Generally, the low temperature burn will be conducted for a period of at least 0.1 hour and preferably at least 0.5 hour. The period of contact with the regeneration gas at the low temperature should be of sufficient duration to remove substantially all of said carbon. Thus, preferably less than 0.1 percent carbon remains in the catalyst following the initial low temperature burn.

Following the low temperature combustion step which removes substantially all of the carbon from the catalyst the catalyst temperature is increased to at least 800° F. but not greater than 900° F. If the oxygen partial pressure in the low temperature combustion step was greater than 1.0 p.s.i.a., it is not necessary to increase the oxygen partial pressure. However, if the oxygen partial pressure in the low temperature combustion step was less than 1.0 p.s.i.a., then the oxygen partial pressure should be increased for the secondary combustion step, i.e., the intermediate temperature contact. Contact of the catalyst with the regeneration gas having an oxygen partial pressure of from 1.0 to 2.5 p.s.i.a. at a temperature of from 800 to 900° F. is performed for a period of time of at least 0.5 hour and preferably 1.0 hour. The intermediate temperature contact with the regeneration gas is performed to permit the complete combustion of residual carbon and also to oxidize at least a portion of the platinum and rhenium present on the catalyst.

Following the intermediate temperature contact, the oxygen partial pressure of the regeneration gas is increased to greater than 2.5 p.s.i.a., but preferably not greater than 7.5 p.s.i.a., while the catalyst temperature is increased to greater than 900° F. but preferably not greater than 1200° F. The high temperature-high oxygen partial pressure contact is conducted for a period of at least 0.5 hour and preferably 2 hours to sufficiently oxidize platinum and rhenium.

When the catalyst temperature is greater than 800° F., i.e., during the intermediate heat treatment or the final heat treatment above 900° F., halide is injected into the regeneration gas stream in contact with the catalyst in an amount sufficient to provide the finished regenerated catalyst with a halide content of at least 0.6 weight percent. Preferably sufficient halide is added to provide the finished catalyst with a halide content of at least 0.75 weight percent. In the case of several reactors, in series, each containing catalyst which is being regenerated, halide can be added to each reactor separately and in different amounts. Generally, if the catalyst has 0.6 weight percent halide prior to the regeneration step, it is not necessary to add halide to the regeneration step except to insure that halide which may be stripped from the catalyst by the high temperature treatment is replaced. Suitable halides which can be injected into the regeneration gas include hydrogen chloride, propylene dichloride, free chlorine gas, free fluorine gas, hydrogen fluoride, etc. For purposes of the present invention, it is preferred that halide be added during the final heat treatment.

During the period of time in which halide is added to the regeneration gas or subsequent thereto, a limited amount of water is preferably present in the regeneration gas. It is preferred that from 0.1 to 5.0 p.s.i.a. water, based on the regeneration gas, be present, more preferably 0.25 to 3.0 p.s.i.a. The water apparently competes with the halide for active sites on the catalyst, thereby helping to uniformly distribute halide throughout the catalyst bed.

After the catalyst has been treated at a temperature of at least 900° F. for at least 0.5 hour at the high oxygen partial pressure and after halide has been added to the regeneration gas in contact with the catalyst, the catalyst is then purged with an inert gas to remove any oxygen from the area of the catalyst and then preferably treated with a hydrogen-containing gas at a temperature above 600° F. and preferably at a temperature from 600 to 1000° F. for a sufficient time to reduce the oxidized platinum and/or rhenium to a lower valence state. Preferably ten times the theoretical amount of hydrogen required to reduce the platinum and rhenium from their highest oxidation states to the metals is used.

The process of the present invention may be more fully understood by reference to the following example.

EXAMPLE

A catalyst comprising 0.6 weight percent platinum, 0.6 weight percent rhenium and 0.6 weight percent chloride in association with alumina was artificially sintered in wet hydrogen at 1200° F. for 24 hours to partially deactivate the catalyst. The sintered catalyst is then life tested in an accelerated reforming test using a naphtha feed boiling within the range of from 151 to 428° F. at reforming conditions, including a pressure of 500 p.s.i.g., a liquid hourly space velocity of 3.0 and a hydrogen to hydrocarbon mol ratio of 5.3 to produce high octane gasoline. The catalyst could not maintain the desired octane product of 100 F-1 clear and the test was terminated after 100 hours.

The coked catalyst from the above-described reforming process was then regenerated by the process of the present invention. The catalyst was heated to a temperature of about 700° F. at a total pressure of 125 p.s.i.g. in a nitrogen-oxygen atmosphere, the oxygen partial pressure being about 1.25 p.s.i.a. After the burning wave had passed through the catalyst bed, and substantially all the carbon removed, the temperature was raised to about 800° F. for the intermediate heat treatment. The oxygen partial pressure was maintained at 1.25 p.s.i.a. The contact with nitrogen and oxygen at 700° F. was continued for about 6 hours, and the contact with nitrogen and oxygen at 800° F. was for about 1.5 hours. Thereafter the catalyst was heated to 950° F. at an oxygen partial pressure of 6.25 p.s.i.a. Chloride, as chloroform, was added to provide the finished catalyst with a chloride content of 0.6 weight percent. Approximately 0.5 p.s.i.a. water was present in the regeneration gas at the 950° F. temperature. The high temperature-high oxygen partial pressure heat treatment was continued for about 2 hours. Following the regeneration the catalyst was contacted with a hydrogen atmosphere at a temperature of 700° F. for 0.5 hour.

The regenerated catalyst was tested for reforming using a feed boiling from 151 to 428° F. and at reforming conditions including a pressure of 500 p.s.i.g., a liquid hourly space velocity of 3 and a hydrogen to hydrocarbon mole ratio of 5.3. 100 F-1 clear octane product was produced. Because the feed initially contained too much water, which resulted in the stripping of chloride from the catalyst, additional chloride was added to the feed after about 100 hours to compensate for the stripped chloride. The water problem was corrected before chloride addition. The reforming characteristics of a fresh catalyst comprising platinum and rhenium, having the same composition as that of the regenerated catalyst described above and having been used for reforming under the same conditions as that described above (except chloride did not have to be added during the process;

the feed did not contain too much water at any time during the run) was compared with the reforming characteristics of the regenerated catalyst.

The average catalyst temperature as a function of run length is shown in FIGURE 1. The initial startup temperature gives an indication of the activity of the catalyst; the lower the starting temperature, the more active the catalyst. The increase in average catalyst temperature as a function of the run length indicates the temperature stability, that is, fouling rate of the catalyst. The lower the fouling rate, that is, the smaller the increase in temperature per unit of time, the better the temperature stability of the catalyst. It is clear from FIGURE 1 that the regeneration technique of the present invention restored the activity and temperature stability characteristics of the deactivated catalyst at least to that of fresh catalyst.

Figure 2:
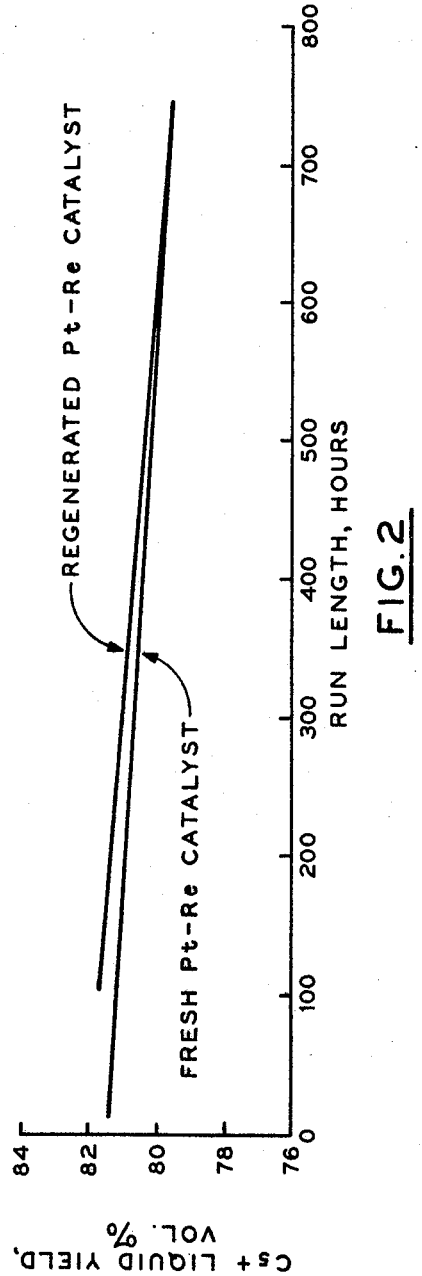

The $C_5+$ liquid yields as a function of run length for the catalyst regenerated by the proces of the present invention and for the fresh catalyst are shown in FIGURE 2. The $C_5+$ liquid yield decline as a function of run length gives an indication of the yield stability of the catalyst; the smaller the yield decline, the better the yield stability. It is evident from FIGURE 2 that the regeneration technique of the present invention restored the yield stability of the deactivated catalyst to that of fresh catalyst.

The foregoing disclosure of this invention is not to be considered as limiting since many variations can be made by those skilled in the art without departing from the scope or spirit of the appended claims.

I claim:

1. A process for regenerating a catalyst comprising a platinum group component and a rhenium component in association with a porous inorganic oxide carrier which catalyst has become deactivated from exposure to a hydrocarbon feed under hydroconversion conditions and has carbonaceous matter accumulated thereon, which comprises:
    (1) contacting the deactivated catalyst with a regeneration gas containing oxygen at a partial pressure of from 0.1 to 2.5 p.s.i.a. at a temperature below about 800° F. for a period of time to remove substantially all of said carbonaceous matter;
    (2) contacting the catalyst from step (1) with a regeneration gas containing oxygen at a partial pressure of from 1.0 to 2.5 p.s.i.a. at a temperature of from 800 to 900° F. for a period of time of at least 0.5 hour;
    (3) contacting the catalyst from step (2) with a regeneration gas containing oxygen at a partial pressure of greater than 2.5 p.s.i.a at a temperature above 900° F. for a period of time of at least 0.5 hour; and
    (4) during the time the catalyst is at a temperature of greater than 800° F., adding a halide into the regeneration gas in a sufficient amount to provide the finished catalyst with a halide content of at least 0.6 weight percent.

2. The process of claim 1 wherein said platinum group component is present in an amount of 0.1 to 5 weight percent and said rhenium component is present in an amount of from 0.01 to 10 weight percent based on the finshed catalyst.

3. The process of claim 1 wherein said halide is chloride.

4. The process of claim 3 wherein sufficient chloride is added to provide the finished catalyst with a chloride content of from 0.6 to 1.5 weight percent.

5. The process of claim 1 wherein said halide is introduced into the regeneration gas in sufficient concentration to provide the finished catalyst with a halide content of at least 0.8 weight percent.

6. The process of claim 1 wherein water in an amount from 0.1 to 5.0 p.s.i.a. is present during at least part of the time halide is present.

7. In a process for reforming a naphtha fraction with a catalyst comprising a platinum group component and a rhenium component in association with a porous inorganic oxide carrier which catalyst has declined in activity during the process and contains carbonaceous deposits, the improvement which comprises the steps of:
    (1) contacting the catalyst with a regeneration gas containing oxygen with a partial pressure of 0.1 to 2.5 p.s.i.a at a temperature of 500 to 800° F. for a period of time of at least 0.1 hour to remove substantially all of said carbonaceous deposits;
    (2) contacting the catalyst from step (1) with a regeneration gas containing oxygen at a partial pressure of 1.0 to 2.5 p.s.i.a. at a temperature of from 800 to 900° F. for a period of time of at least one hour;
    (3) contacting the catalyst from step (2) with a regeneration gas containing oxygen at a partial pressure of from 2.5 to 7.5 p.s.i.a. and with halide in a sufficient amount to provide the finished catalyst with at least 0.6 weight percent halide at a temperature of greater than 900° F. for a period of time of at least two hours;
    (4) then contacting the catalyst from step (3) with a hydrogen containing gas at a temperature above 600° F.; and
    (5) reutilizing the regenerated catalyst in the reforming process.

References Cited

UNITED STATES PATENTS

| | | | |
|---|---|---|---|
| 2,908,636 | 10/1959 | Steffgen et al. | 208—140 |
| 3,011,968 | 12/1961 | Webb | 208—140 |
| 3,144,402 | 8/1964 | Schwarzenbek et al. | 208—140 |
| 3,296,118 | 1/1967 | Czajkowski et al. | 208—139 |
| 3,344,060 | 9/1967 | Evering et al. | 208—140 |
| 3,400,073 | 9/1968 | Schwarzenbek et al. | 208—138 |
| 3,407,135 | 10/1968 | Brown | 208—140 |

HERBERT LEVINE, Primary Examiner

U.S. Cl. X.R.

252—415, 419